(12) United States Patent
Loftis et al.

(10) Patent No.: US 9,583,012 B1
(45) Date of Patent: Feb. 28, 2017

(54) SYSTEM AND METHOD FOR DETECTION AND AVOIDANCE

(71) Applicant: The Boeing Company, Chicago, IL (US)

(72) Inventors: Richard J. Loftis, Arlington, WA (US); Andrew Armatorio, Everett, WA (US); Robert P. Higgins, Seattle, WA (US); Tuan Anh Chau Nguyen, Kent, WA (US)

(73) Assignee: The Boeing Company, Chicago, IL (US)

( * ) Notice: Subject to any disclaimer, the term of this patent is extended or adjusted under 35 U.S.C. 154(b) by 270 days.

(21) Appl. No.: 13/968,572

(22) Filed: Aug. 16, 2013

(51) Int. Cl.
*G08G 5/00* (2006.01)
*G08G 5/04* (2006.01)
*G06K 9/00* (2006.01)

(52) U.S. Cl.
CPC ........... *G08G 5/04* (2013.01); *G06K 9/00624* (2013.01)

(58) Field of Classification Search
CPC .............................. G08G 5/04; G06K 9/00624
USPC ........................................................ 348/144
See application file for complete search history.

(56) References Cited

U.S. PATENT DOCUMENTS

| | | | | |
|---|---|---|---|---|
| 5,631,640 | A * | 5/1997 | Deis et al. | 340/961 |
| 6,678,394 | B1 * | 1/2004 | Nichani | G05D 1/0251 348/169 |
| 2003/0025614 | A1 * | 2/2003 | Kahn | 340/961 |
| 2004/0117086 | A1 * | 6/2004 | Rao | B60R 21/013 701/36 |
| 2005/0185824 | A1 * | 8/2005 | Chen | 382/103 |
| 2009/0018711 | A1 * | 1/2009 | Ueda | G08G 1/165 701/1 |
| 2011/0125349 | A1 * | 5/2011 | Ace | 701/14 |
| 2013/0321192 | A1 * | 12/2013 | Starr | G01S 7/04 342/29 |
| 2014/0293750 | A1 | 10/2014 | Papin et al. | |

OTHER PUBLICATIONS

"Airbus Patents Plans to Frighten Birds Away From Planes and Airports," skift.com (Oct. 14, 2014).
"EasyJet Unveils Ash Detector to End Large-Scale Disruption," http://corporate.easyjet.com/media/latest-news/news-year-2010/04-06-2010.aspx (2010).

* cited by examiner

*Primary Examiner* — Jeffery Williams
(74) *Attorney, Agent, or Firm* — Walters & Wasylyna LLC

(57) ABSTRACT

A system for detection and avoidance may include an image capture system configured to be connected to a vehicle, the image capture system being configured to obtain and transmit images, and a detection system configured to communicate with the vehicle and/or an operator of the vehicle, the detection system being configured to receive the images, process the images to identify an object, determine whether the object will potentially strike the vehicle, generate a strike avoidance report including information indicating that a potential strike will occur and an avoidance command to avoid the potential strike in response to a determination that the potential strike will occur, and send the strike avoidance report to a vehicle management system.

20 Claims, 9 Drawing Sheets

SYSTEM AND METHOD FOR DETECTION AND AVOIDANCE

FIELD

The present disclosure is generally related to systems and methods for detection of objects and, more particularly, to a system and method for detection of an object with respect to a vehicle and avoidance of a potential collision with the object.

BACKGROUND

Many modern commercial aircraft are designed to withstand impacts with small objects (e.g., birds) without affecting the safe operation of the aircraft. While impacts with certain small objects may not generally affect the safety of the aircraft, such impacts may have effect on the aerodynamic performance of the aircraft or create other inconsistencies of operation.

Furthermore, aircraft regulatory rules may require a diversion or turn back of the aircraft or enhanced inspections of the aircraft if an object strikes the aircraft even if the strike does not result in any damage. As a result, mid-air impacts may result in significant costs for an airline and other aircraft operators.

However, impacts with small objects may be a safety issue for certain non-commercial aircraft. For example, unmanned aerial vehicles and other relatively small aircraft may have less capacity to carry systems and structures that are resistant to damage from a bird strike. A bird strike may cause a significant issue for aircraft with stealth capabilities by causing inconsistencies in the coatings or other features than make the aircraft stealthy.

Additionally, even a relatively small object can cause significant surface damage to the aircraft. For example, a small bird colliding with an airplane (e.g., at takeoff or cruising speeds) may impact with a force of about two tons or more.

The majority of historical bird strikes occurred at altitudes below 3000 feet. Typical current bird detection and avoidance systems and schemes are ground based (e.g., dogs, falcons, air cannons, and radar systems) and are ineffective at distances beyond an airport and do not protect from mid-air strikes throughout the movement envelope.

SUMMARY

In one embodiment, the disclosed system for detection and avoidance may include an image capture system configured to be connected to a vehicle, the image capture system being configured to obtain and transmit images, and a detection system configured to communicate with the vehicle, the detection system being configured to receive the images, the images including a photographic representation in the direction of motion of the vehicle, process the images to identify an object, determine whether the object will potentially strike the vehicle, generate a strike avoidance report including information indicating that a potential strike will occur and an avoidance command to avoid the potential strike in response to a determination that the potential strike will occur, and send the strike avoidance report to a vehicle management system.

In another embodiment, the disclosed system for detection and avoidance may include at least two cameras on an aircraft, the cameras being configured to provide images obtained at substantially the same time and a detection system on the aircraft, the detection system including an image receiver configured to receive a sequence of the images from the cameras, an image processor configured to process the sequence of images to identify an airborne object (e.g., a bird) in the sequence of images and to identify and track movement of the airborne object with respect to the aircraft, a strike predictor configured to compare the movement of the airborne object with respect to the aircraft to determine whether the movement of the airborne object indicates that a potential strike will occur, a strike avoidance report generator configured to generate a strike avoidance report, and a strike avoidance report sender configured to transmit the strike avoidance report to a vehicle management system of the aircraft.

In another embodiment, also disclosed is a method for detection and avoidance, the method may include the steps of: (1) identifying an object in images received from an image capture system on a vehicle, (2) identifying and tracking movement of the object with respect to the vehicle from images, (3) determining whether the movement of the object with respect to the vehicle indicates that a potential strike will occur, (4) generating a strike avoidance report including information indicating that the potential strike will occur and an avoidance command in response to a determination that the potential strike will occur, and (5) sending the strike avoidance report to a user of the strike avoidance report.

Other embodiments of the disclosed system and method will become apparent from the following detailed description, the accompanying drawings and the appended claims.

DETAILED DESCRIPTION

Figure 1:
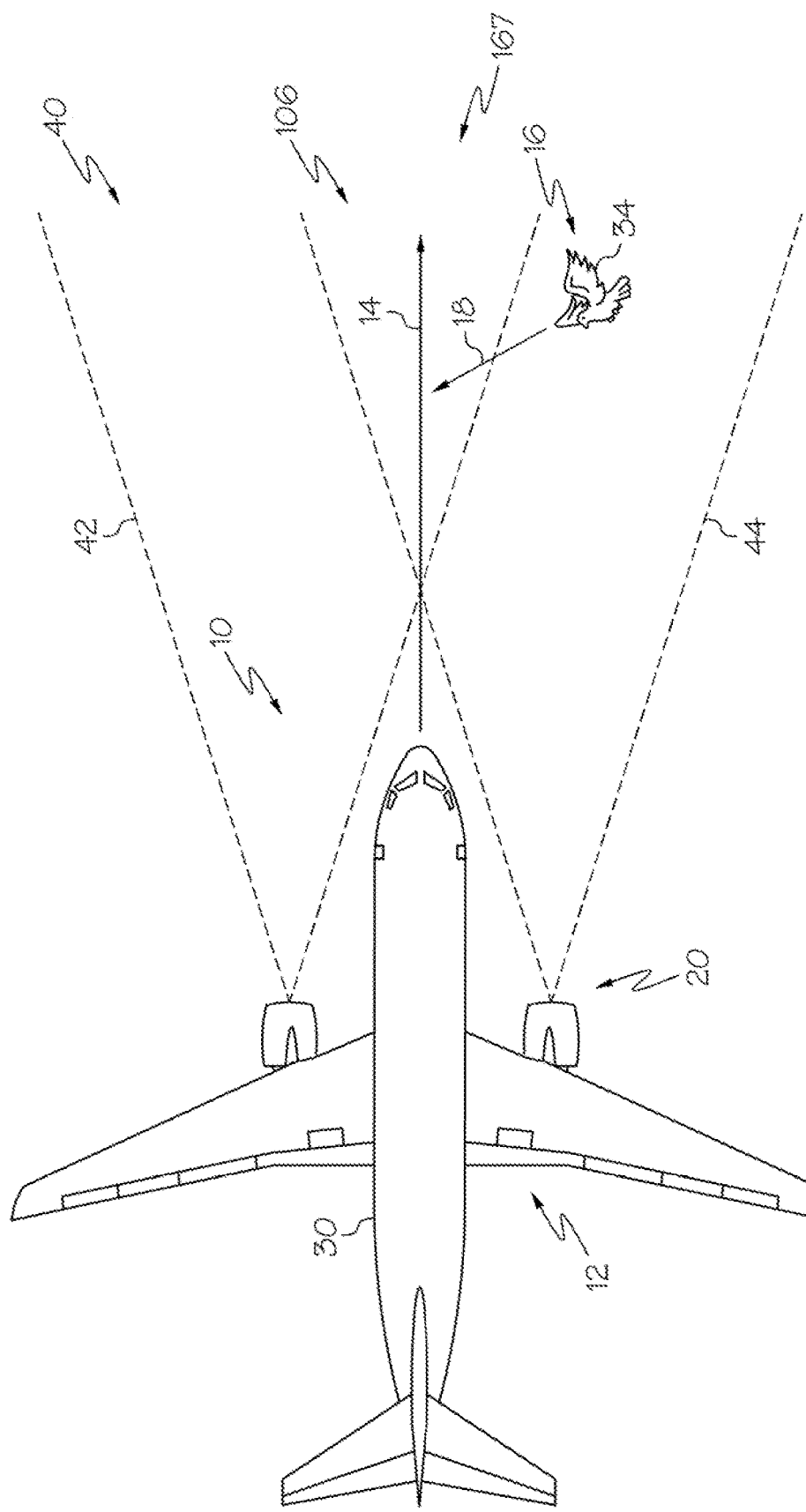
FIG. 1 is a schematic illustration of one embodiment of the disclosed system for detection and avoidance.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed system, generally designated 10, for detection and avoidance may be used in association with a vehicle 12. The vehicle 12 may be moving along a path (e.g., in the direction indicated by direction arrow 14). An object 16 may be moving along a path (e.g., in a direction indicated by arrow 18). Depending upon the relative positions and/or relative movements of the vehicle 12 and/or the object 16, the object 16 may impact with (e.g., strike) the vehicle 12. Those skilled in the art will appreciate that the vehicle 12 and object 16 may not necessarily be shown to scale in FIG. 1.

Throughout the present disclosure, the terms "strike", "struck", "collision", "collide" and any similar or related terms may refer to the impact of the vehicle 12 and the object 16. For example, the phrase "an object striking or potentially striking a vehicle" may refer to a moving vehicle 12 impacting with a moving object 16 (e.g., an airborne object).

In the example embodiment illustrated in FIG. 1, the vehicle 12 may be any type of aircraft 30. For example and without limitation, the aircraft 30 may be a fixed wing, a rotary wing, or a lighter than air aircraft. The aircraft 30 may be manned or unmanned. As an example, the aircraft 30 may be a commercial passenger aircraft operated by an airline, a cargo aircraft operated by a private or public entity, a military aircraft operated by a military or other government organization, a personal aircraft operated by an individual, or any other type of aircraft operated by any other aircraft operator. As another example, the aircraft 30 may be an unmanned aerial vehicle (UAV) operated by a remote operator.

Thus, those skilled in the art will appreciate that the vehicle 12 (e.g., an aircraft 30) may be designed to perform any mission and may be operated by any operator of the vehicle 12.

The object 16 may be any object that may potentially strike the vehicle 12. As an example, the object 16 may be any moving airborne object moving along a path 18 that may intersect the path 14 of the vehicle 12. For example, as illustrated in FIG. 1, the object 16 may be a bird 34. As another example and without limitation, the object 16 may be another aircraft, or any other airborne man-made or natural object.

Figure 2:
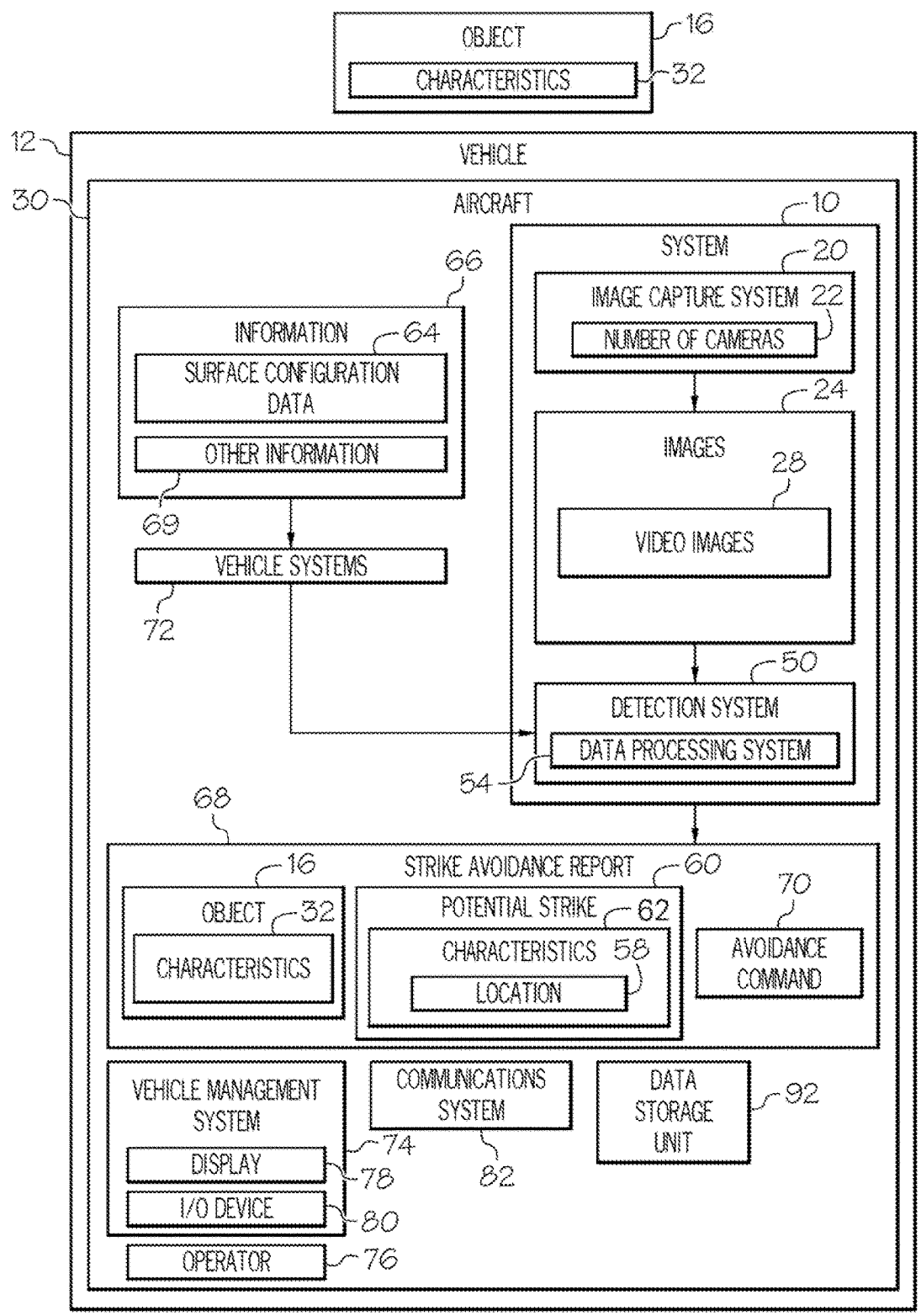
FIG. 2 is a block diagram of an embodiment of the disclosed system for detection and avoidance.

Referring to FIG. 2, the system 10 may include at least one image capture system 20. The image capture system 20 may be connected to the vehicle 12 (e.g., an aircraft 30). The image capture system 20 may include a number of cameras 22 configured to obtain data. The image capture system 20 may be configured to capture one or more images 24. For example, the image capture system 20 may include the number of cameras 22 connected (e.g., integral or attached) to the vehicle 12.

Figure 6:
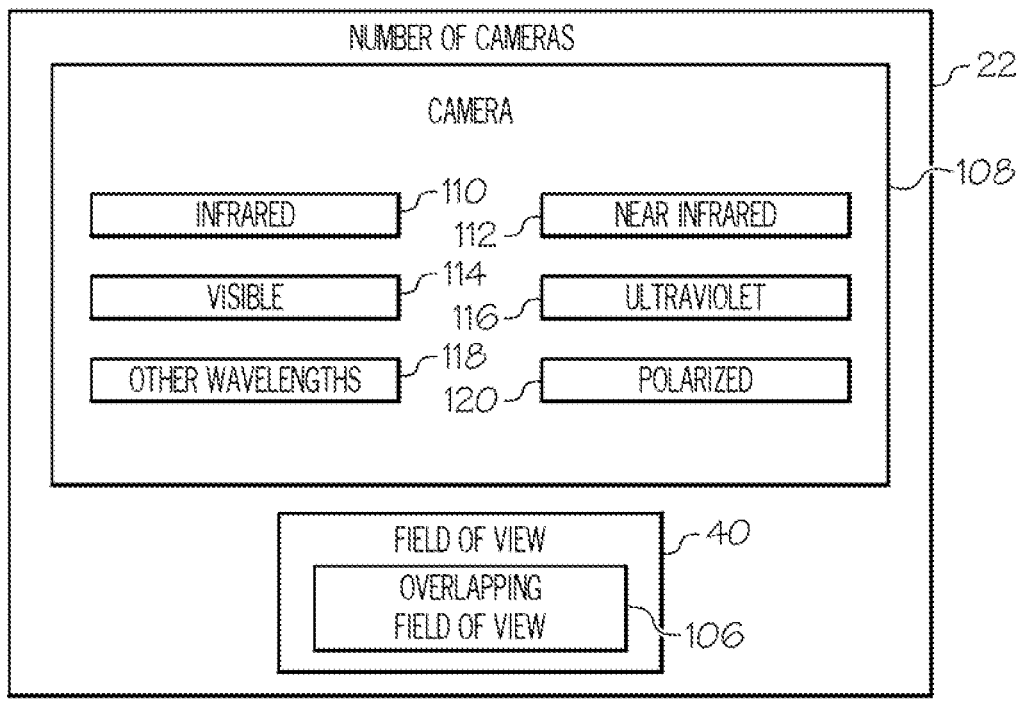
FIG. 6 is a block diagram of an embodiment of the number of cameras of the image capture system.

For example, the number of cameras 22 of the image capture system 20 may include at least one camera 108 (FIG. 6). As another example, the number of cameras 22 may include at least two cameras 108. As still another example, the number of cameras 22 may include two or more cameras 108.

In an example implementation, the images 24 may be video images 28. The video images 28 may include a sequential series of digital video image frames taken rapidly over a period of time (e.g., 30 Hz). The images 24 provided by the number of cameras 22 may be used to detect the presence of one or more objects 16 and to identify one or more characteristics 32 of the object 16. For example, the system 10 may process the images 24 to track the movement 36 (e.g., trajectory of the object along path 18) of the object 16 relative to the movement (e.g., trajectory of the vehicle along path 14) of the vehicle 12. For example, the system 10 may process the images 24 to identify the position (e.g., location) of the object 16 (e.g., bird 34) relative to the vehicle 12 (e.g., aircraft 30) and to predict the future movement 36 of the object 16 relative to the future movement of the vehicle 12. The system 10 may estimate the probability of a collision between the vehicle 12 and the object 16 based on the predicted movements of the object 16 and the vehicle 12 (e.g., determine the probability that the path 18 of the object 16 will intersect the path 14 of the vehicle 12 at some point in time in the future).

Referring back to FIG. 1, the image capture device 20 may include a field of view 40. For example, each camera 108 (FIG. 6) of the number of cameras 22 may include a field of view 40. In an example implementation, the number of cameras 22 may include a combined field of view 40. In another example implementation, the number of cameras 22 may include an overlapping field of view 106. For example, at least two cameras 108 (FIG. 6) may be used including an overlapping field of view 106 in order for the system 10 to determine the distance 39 (FIG. 3) of the object 16 relative to the vehicle 12 using a stereo solution (e.g., stereo vision).

For example, the field of view 40 may be defined by the area 167 in front of the vehicle 12 (e.g., aircraft 30) between lines 42 and 44 (e.g., in the direction of movement 14 of the vehicle 12). The object 16 (e.g., a bird 34) may be within the field of view 40. Therefore, the images 24 from the number of cameras 22 may include images of the object 16.

The number of cameras 22 (FIG. 2) of the image capture system 20 may be connected to the vehicle 12 at various positions and orientations. The number of cameras 22 may face in any appropriate direction. For example, the number the cameras 22 may generally face forward on the vehicle 12 (e.g., in the direction of movement) in order to view the object 16 in the path of the vehicle 12 or crossing the path of the vehicle 12 (e.g., within the field of view 40 of the image capture system 20).

Additionally, in order to avoid a collision, the object 16 may need to be detected greater than a sufficient time prior to the potential strike 60 (FIG. 2). Thus, the object 16 may need to be detected greater than a minimum distance from the vehicle 12 prior to the potential strike 60 given the relative velocities and movements of the vehicle 12 and/or the object 16.

Accordingly, the number of cameras 22 of the image capture system 20 may include multiple focal lengths sufficient to identify the object 16 at various distances (e.g., greater than the minimum distance) relative to the vehicle 12 depending upon the velocity of the vehicle 12.

For example, the number of cameras 22 may include at least one camera 108 (FIG. 6) having a focal length and field of view 40 sufficient for relatively low speeds and at least one camera 108 having a focal length and field of view 40 sufficient for relatively high speeds. As another example, the number of cameras 22 may include at least one camera 108 having multiple focal lengths and multiple fields of view 40 sufficient for both relatively low speeds and relatively high speeds.

Referring again to FIG. 2, the system 10 may include a detection system 50. The detection system 50 may be configured to receive the images 24 transmitted by the image capture system 20. The detection system 50 may be configured to process the images 24 and determine the presence of the object 16 and whether the object 16 is likely to strike the vehicle 12. The detection system 50 may also be configured to identify and/or determine various characteristics 32 of the object 16 based on the images 24. The detection system 50 may also be configured to determine various characteristics 62 of a potential strike 60.

The detection system 50 may be configured to generate a strike avoidance report 68 based on the processed images 24 and various information 66 about the vehicle 12. For example, the strike avoidance report 68 may include, without limitation, the characteristics 32 of the object 16, the characteristics 62 of a potential strike 60, and/or an avoidance command 70.

The images 24 taken from the image capture system 20 (e.g., number of cameras 22) may be processed by the detection system 50 to identify the object 16 in the images 24. Distance 39 (FIG. 3) of the object 16 with respect to the vehicle 12 may be determined based on the stereo vision of the image of the object 16 in the images 24. Movement 36 (FIG. 3) of the object 16 with respect to the vehicle 12 may be determined based on movement of the object 16 in the images 24 over time. Distance 39 and movement 36 of the object 16 with respect to the vehicle 12 may be used to determine whether the object 16 is likely to strike the vehicle 12 (e.g., the probability of the potential strike 60). The characteristics 32 of the object 16 may also be determined from the images of object 16 in the images 24.

Figure 3:
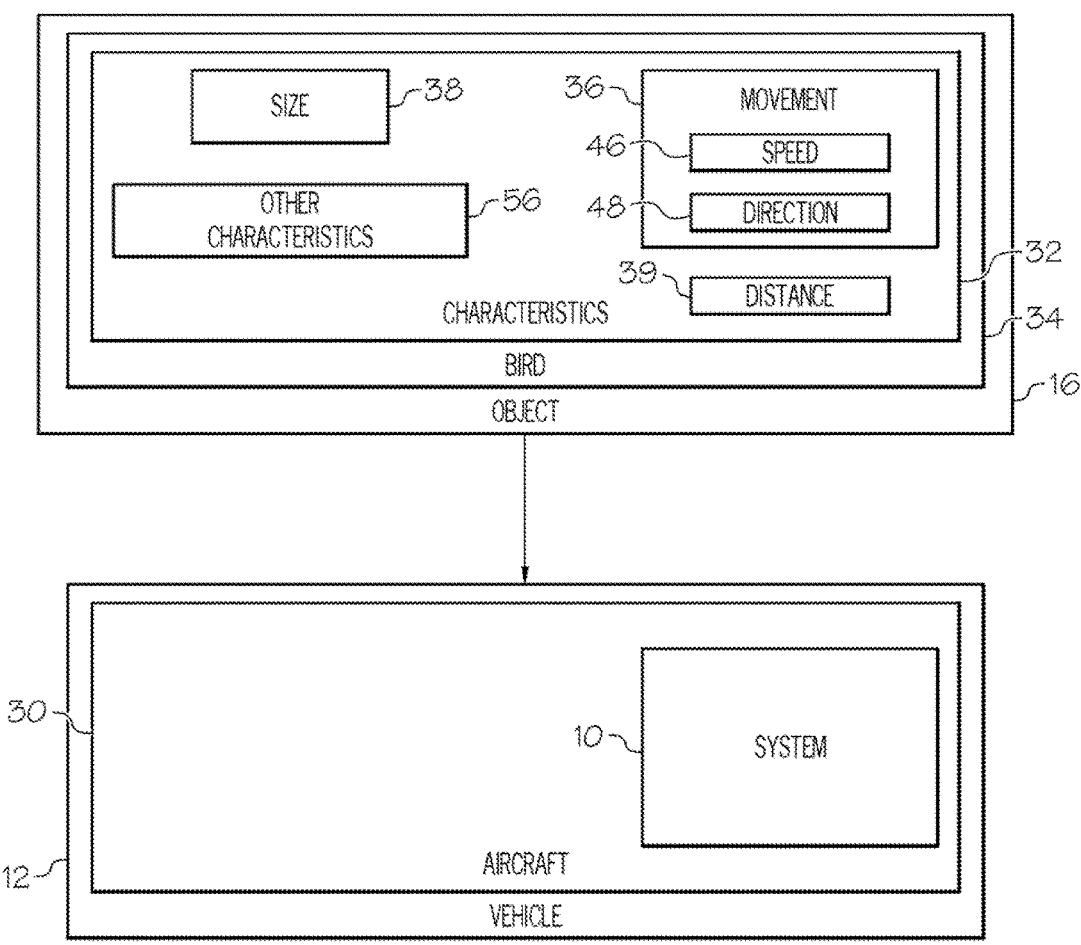
FIG. 3 is a block diagram of an embodiment of an object.

Referring to FIG. 3, the characteristics 32 of the object 16 may include, without limitation, approximate size 38 of the object 16, movement 36 of the object 16 (e.g., including approximate speed 46 of the object 16 and approximate direction 48 of the object 16), approximate distance 39 of the object 16 relative to the vehicle 12, other characteristics 56, or various combination of such characteristics 32. Movement 36 may refer to movement of the object 16 with respect to the vehicle 12. For example, movement 36 of the object 16 may be characterized by the direction 48 of movement of the object 16 with respect to the vehicle 12, the speed 46 of the object 16 with respect to the vehicle 12, or a combination of both direction 48 and speed 46. Movement 36 may also be referred to as the trajectory of the object 16 (e.g., along path 18) with respect to the movement (e.g., trajectory) of the vehicle 12 (e.g., along path 14).

Referring to FIGS. 2 and 3, the detection system 50 may be configured to identify and/or determine the distance 39, the movement 36, the size 38, or other characteristics 56 of the object 16, or various combinations of such characteristics 32 from the images 24. The detection system 50 may be configured to track the relative movements of the object 16 and/or the vehicle 12 over time to compute the probability of the potential strike 60. For example, the detection system 50 may be configured to use movement 36 (e.g., movement of the object 16 relative to the vehicle 12) or movement 36 (e.g., relative movement) in combination with distance 39 to determine whether the object 16 is likely to strike the vehicle 12. The detection system 50 may also be configured to use movement 36 or movement 36 in combination with various characteristics 32 of the object 16 to identify an approximate predicted location 58 of the potential strike 60 on the vehicle 12. Further, the detection system 50 may also be configured to use movement 36, size 38, other characteristics 56, or various combinations of such characteristics 32 to identify the characteristics 62 of the potential strike 60.

The images 24 (e.g., images of the object 16) processed to determine the characteristics 32 of the object 16 may depend on various characteristics of the number of cameras 22 and/or the resolution of the images 24.

Referring again to FIG. 2, the location 58 of the potential strike 60 may be a location on the vehicle 12 that may potentially be struck by the object 16 if no corrective actions (e.g., countermeasures or evasive actions) are taken by the operator 76 of the vehicle 12 or the vehicle 12 itself. For example, the location 58 of the potential strike 60 may be the predicted location on the surface of the aircraft 30 that may be struck by the bird 34 given the trajectory of the bird 34 with respect to the trajectory of the aircraft 30.

The detection system 50 may be configured to determine if the object 16 is likely to strike the vehicle 12 and to identify the predicted location 58 of the potential strike 60 using movement 36 or movement 36 in combination with surface configuration information 64 of the vehicle 12. Surface configuration information 64 may include information describing the configuration of various surfaces of the vehicle 12 that may be potentially struck by the object 16. For example, the surface configuration information 64 may include any information describing the size and shape of the vehicle 12 or of any portion of the vehicle 12. As a specific non-limiting example, the surface configuration information 64 may include information describing the configuration of one or more surfaces of the aircraft 30.

For example, the surface configuration information 64 of the aircraft 30 may be loaded on the aircraft 30 before a flight and/or in real time. The surface configuration information 64 may be changed during flight to reflect changes to the surface of the aircraft 30 during flight. In an example implementation, the representation of the surface of the aircraft 30 may be changed during flight based on estimated weight of the aircraft 30, which decreases as fuel is consumed, on wing bending as measured by a camera on the aircraft 30, and/or on other factors or combination of factors.

Figure 8:
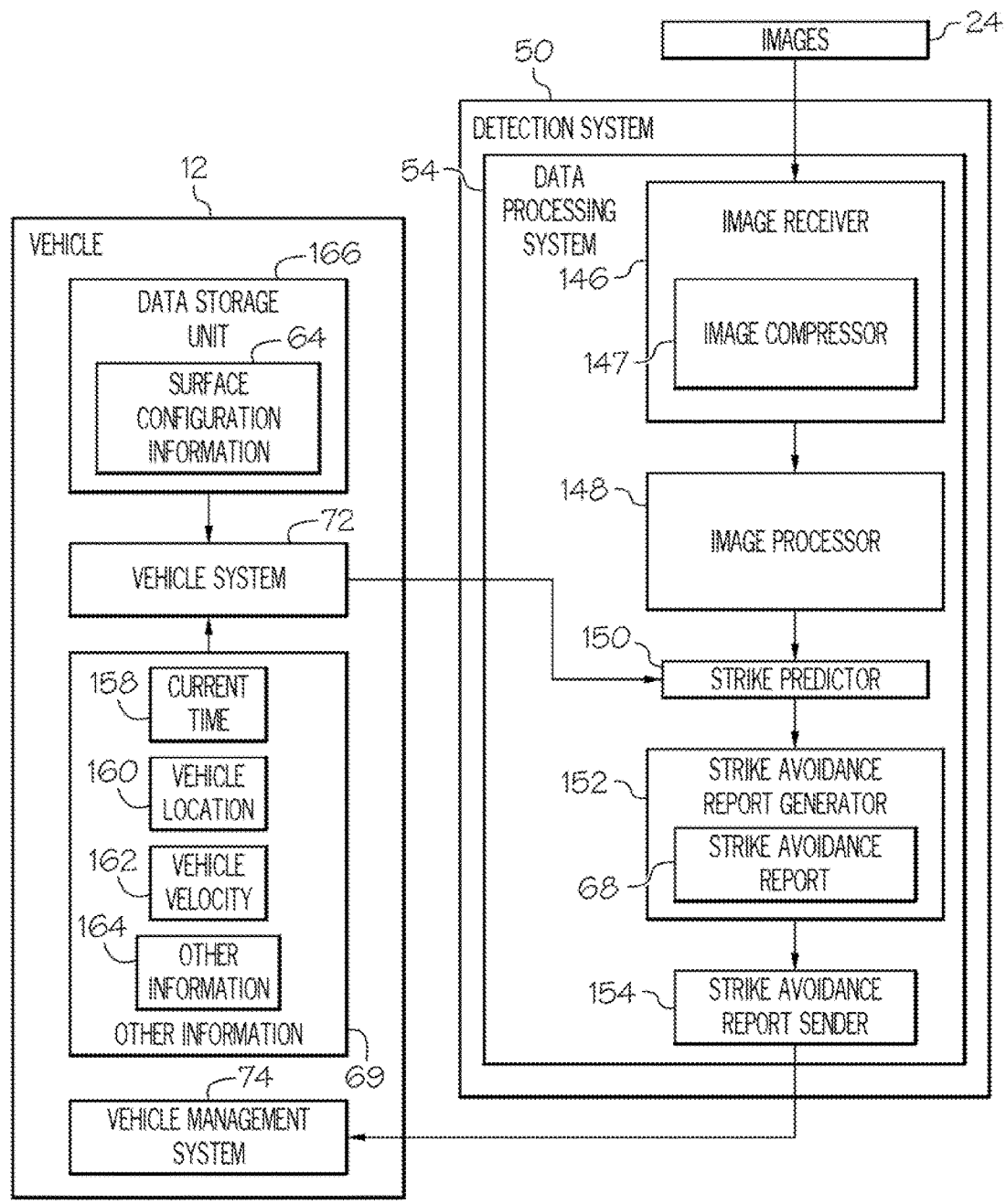
FIG. 8 is a block diagram of an embodiment of the detection system of the disclosed system for detection and avoidance.

Referring to FIG. 8, the detection system 50 may be configured to use other information 69 about the vehicle in addition to the processed images 24 and surface configuration data 64 to determine if the object 16 is likely to strike the vehicle 12 and/or identify various characteristics 62 of the potential strike 60. For example and without limitation, the information 69 may include the current time 158, the current vehicle location 160, the current vehicle velocity 162, or any other appropriate information 164 that may be used and/or processed by the detection system 50 to determine if the object 16 is likely to strike the vehicle 12 and/or to identify the various characteristics of the potential strike 60.

Referring to FIGS. 2 and 8, the vehicle information 66 (e.g., surface configuration data 64 and other information 69) may be provided by one or more vehicle systems 72 (e.g., aircraft systems). The detection system 50 may be configured to receive the information 66 from the vehicle systems 72. The vehicle systems 72 may include various systems and devices on the vehicle 12 that may be configured to provide the information 66. For example and without limitation, the vehicle systems 72 may include a navigation system of the aircraft 30, such as a satellite based positioning system unit, an inertial navigation system unit, or any other system or device on the aircraft 30 for providing information 66.

Referring again to FIG. 2, the strike avoidance report 68 may indicate that the object 16 is likely to strike the vehicle 12. The strike avoidance report 68 may include information identifying various characteristics 32 of the object 16, information identifying various characteristics 66 of the potential strike 60, one or more avoidance commands 70, or various combinations of such information and commands. The avoidance commands 70 may include information identifying one or more countermeasures that may be employed to avoid the potential strike 60 with the object 16.

The strike avoidance report 68 may be used for a variety of purposes. The particular format of the strike avoidance report 68 and the particular information and/or commands that may be included in the strike avoidance report 68 may depend upon how the strike avoidance report 68 is to be used and/or the user or device that may receive the strike avoidance report 68.

The strike avoidance report 68 may be displayed on a vehicle management system 74 to one or more operators 76 of the vehicle 12 (e.g., a pilot and/or flight crew of the aircraft 30). The vehicle management system 74 may include a vehicle management computer or other system that may be used for managing and/or controlling the vehicle 12. For example, the vehicle management system 74 may be a flight management system or flight control system configured to manage the flight of the aircraft 30. The vehicle management system 74 may include at least one display 78. The display 78 may include any audio and/or visual display device configured to display the strike avoidance report 68 to the operator 76 of the vehicle 12.

The vehicle management system 74 may also include an input/output ("I/O") device 80. The input/output device 80 may include any device configured to allowing the operator 76 to interact with the vehicle management system 74, and in particular, with the strike avoidance report 68. For example, the input/output devices 80 may include a touch screen, physical buttons, sliders, switches, data ports, keyboard, mouse, voice activated interfaces, or any other suitable devices.

For example and without limitation, the vehicle management system 74 may include an electronic flight bag ("EFB"), an onboard computer system, a portable computer system (e.g., laptop computer or tablet computer), a smart phone, a personal data assistant ("PDA"), or display system in the cockpit of the aircraft 30.

In an example implementation, the operator (or operators) 76 of the vehicle 12 may use the information in the strike avoidance report 68 that is displayed on the display 78 of the vehicle management system 74 to make one or more decisions regarding operations of the vehicle. For example and without limitation, the operator 76 may use the information in the strike avoidance report 68 (e.g., characteristics 32 of the object 16, characteristics 66 of the potential strike 60, and/or one or more avoidance commands 70) to make decisions about course corrections, countermeasures, or any other evasive action to avoid the potential strike 60 of the object 16 and the vehicle 12. For example, the operator 76 may use the strike avoidance report 68, and particularly the avoidance command 70, for controlling the aircraft 30 to take evasive actions to avoid the predicted strike 60 by the bird 34 on the aircraft 30. Avoidance of the potential strike 60 along with information identifying characteristics of the object 16 and the potential strike 60 should it occur may allow the operator 76 of the vehicle 12 to avoid costly diversions, increased inspections, and/or repairs to the vehicle 12.

In another example implementation, the vehicle management system 74 may process the information in the strike avoidance report 68 and automatically make decisions about course corrections, countermeasures, or any other evasive action to avoid the potential strike 60 of the object 16 and the vehicle 12. For example, the strike avoidance report 68, and particularly the avoidance command 70, may be used by the vehicle management system 74 (e.g., flight management and/or control system) for controlling the aircraft 30 to automatically take evasive actions to avoid the predicted strike 60 by the bird 34 on the aircraft 30. As such, any evasive action may be performed without involvement of the operator 76.

In another example implementation, the strike avoidance report 68 may be provided to a communications system 82 of the vehicle 12 for transmission to a location off board of the vehicle 12. For example and without limitation, the communication system 82 may include a radio or other system of the aircraft 30 configured to transmit the strike avoidance report 68 from the aircraft 30 to a location on the ground or any other location off board of the aircraft 30. For example, the communications system 82 may be used to transmit the strike avoidance report 68 to a remote operator controlling the aircraft 30 (e.g., in cases where the aircraft 30 is an unmanned aerial vehicle).

Those skilled in the art will appreciate that the strike avoidance report 68 may be sent to various other users or combination of users that may be different from or in addition to the users of the strike avoidance report 68 described herein. The information in the strike report 68 may be used by such other users for various purposes and in various ways that may be different from or in addition to the uses of the strike avoidance report 68 described herein.

The strike avoidance report 68 may be stored in one or more data storage units 92. For example and without limitation, the data storage unit 92 may include any suitable data storage device. The data storage unit 92 may be located on board of the vehicle 12, at a location off board of the vehicle 12 (e.g., remote data storage system 84) (FIG. 4.), or both. For example, the information (e.g., vehicle information 66, characteristics 32 of the object 16, images 24, and/or avoidance commands 70) in the strike avoidance report 68 may be retrieved from the data storage unit 92 at any appropriate time by any user of the information in the strike avoidance report 68.

Figure 4:
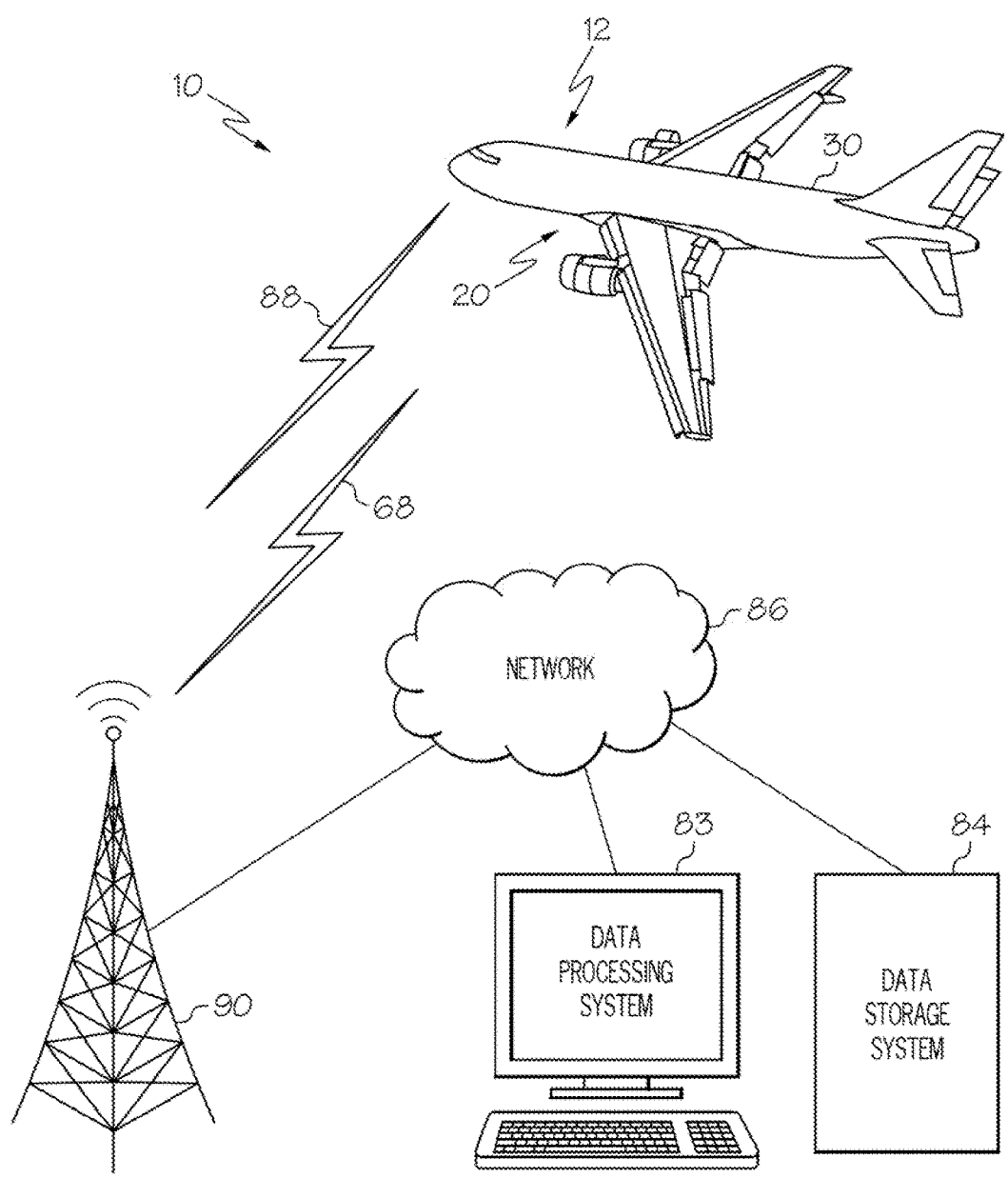
FIG. 4 is a schematic illustration of another embodiment of the disclosed system for detection and avoidance.

Referring to FIG. 4, in another example implementation, some or all of the functions of the detection system 50 (FIG. 2) may be performed by a remote data processing system 83. The communications system 82 (FIG. 2) may be configured to transmit some or all of the information 88 related to the vehicle 12 (e.g., vehicle information 66), the characteristics 32 of the object 16, the images 24 (FIG. 2), or combinations thereof to the remote data processing system 83. The vehicle management system 74 (FIG. 2) may be communicatively connected to one or more remote data processing systems 83 and/or to one or more remote data storage systems 84 via one or more networks 86 or other communication links. For example, the transmitted information 88 may be received by a transceiver 90 communicatively connected to the one or more networks 86.

The remote data processing system 83 may include one or more devices operable to receive information 88 from the vehicle management system 74 (e.g., via the communications system 82) and further process the information 88 (e.g., vehicle information 66, characteristics 32 of the object 16, and/or images 24), display the strike avoidance report 68, and/or transmit the strike avoidance report 68 to the vehicle 12.

The remote data processing system 83 may be configured to transmit the strike avoidance report 68 (e.g., via the transceiver 90) back to the vehicle management system 74 (FIG. 2). In an example implementation, the vehicle management system 74 may display the strike avoidance report 68 to the operator 76 of the vehicle 12 to use the strike avoidance report 68 to make decisions about course corrections, countermeasures, or any other action to avoid the potential strike 60 of the object 16 and the vehicle 12. In another example implementation, the vehicle management system 74 may process the strike avoidance report 68 received from the remote data processing system 83 and automatically make decisions about course corrections, countermeasures, or any other action to avoid the potential strike 60 of the object 16 and the vehicle 12.

Figure 5:
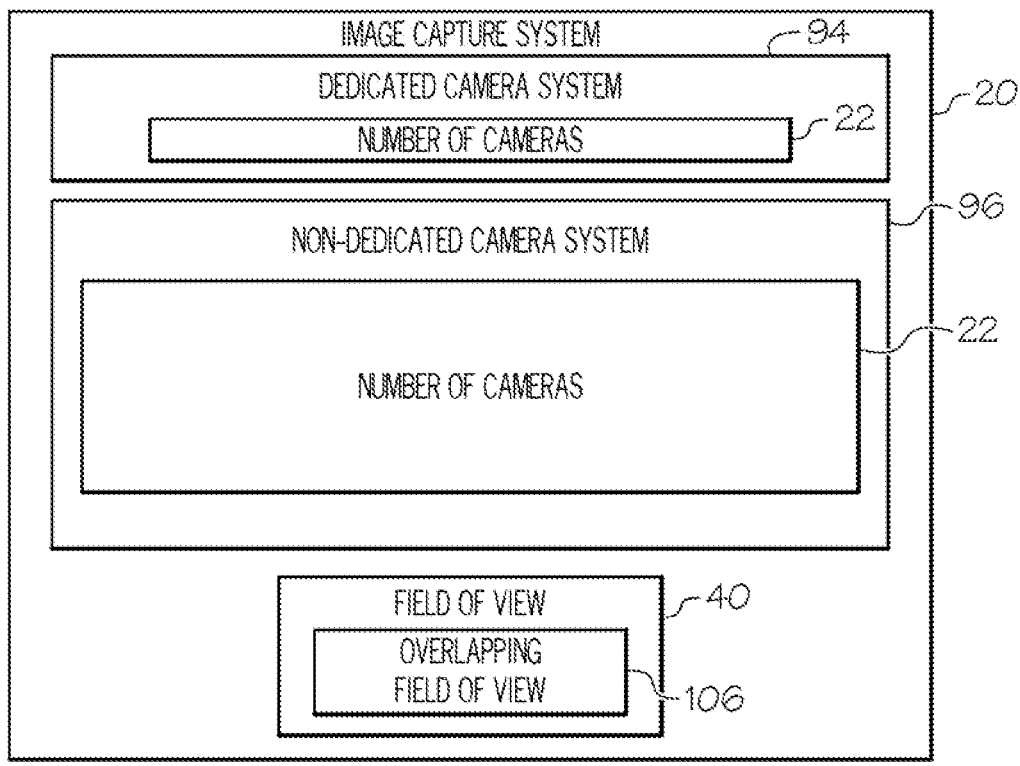
FIG. 5 is a block diagram of an embodiment of the image capture system of the disclosed system for detection and avoidance.

Referring to FIG. 5, the image capture system 20 may be one or more dedicated camera systems 94 or one or more non-dedicated camera systems 96. The image capture system 20 may include the field of view 40. The dedicated camera system 94 and the non-dedicated camera system 96 may include the number of cameras 22. The number of cameras 22 may have one or more overlapping fields of view 106.

The number of cameras 22 of the non-dedicated camera system 96 may be provided on the vehicle 12 for obtaining images for a primary purpose other than for use by the detection system 50. For example, the images 24 obtained by the non-dedicated camera system 96 may be used both for detection of the potential strike 60 (FIG. 2) and for some other purpose.

Referring to FIG. 6, the number of cameras 22 may include multiple cameras 108 (or camera systems) with overlapping fields of view 106. Overlapping fields of view 106 may allow for stereo tracking of the object 16 in the images 24 provided by the number of cameras 22 (e.g., at least two cameras 108). The number of cameras 22 may include the same type of cameras or a number of different types of cameras.

For example, the number of cameras 22 may include one or more cameras 108 (e.g., video camera). The cameras 108 may operate over any range or ranges of wavelengths and/or frequencies to obtain images 24 (e.g., video images 28) (FIG. 2). For example and without limitation, the cameras 108 may be configured to obtain images 24 at infrared 110, near infrared 112, visible 114, ultraviolet 116, other wavelengths 118, or combinations of wavelengths. The cameras 108 may be configured to obtain images 24 from light that is polarized 120.

For example, the number of cameras 22 may include one or more long-wavelength infrared ("LWIR") cameras. As another example, the number of cameras 22 may include one or more med-wavelength infrared ("MWIR") cameras. As another example, the number of cameras 22 may include one or more short-wavelength infrared ("SWIR") cameras. As still another example, the number of cameras 22 may include a combination of one or more long-wavelength infrared cameras, med-wavelength infrared cameras, and short-wavelength infrared cameras.

Figure 7:
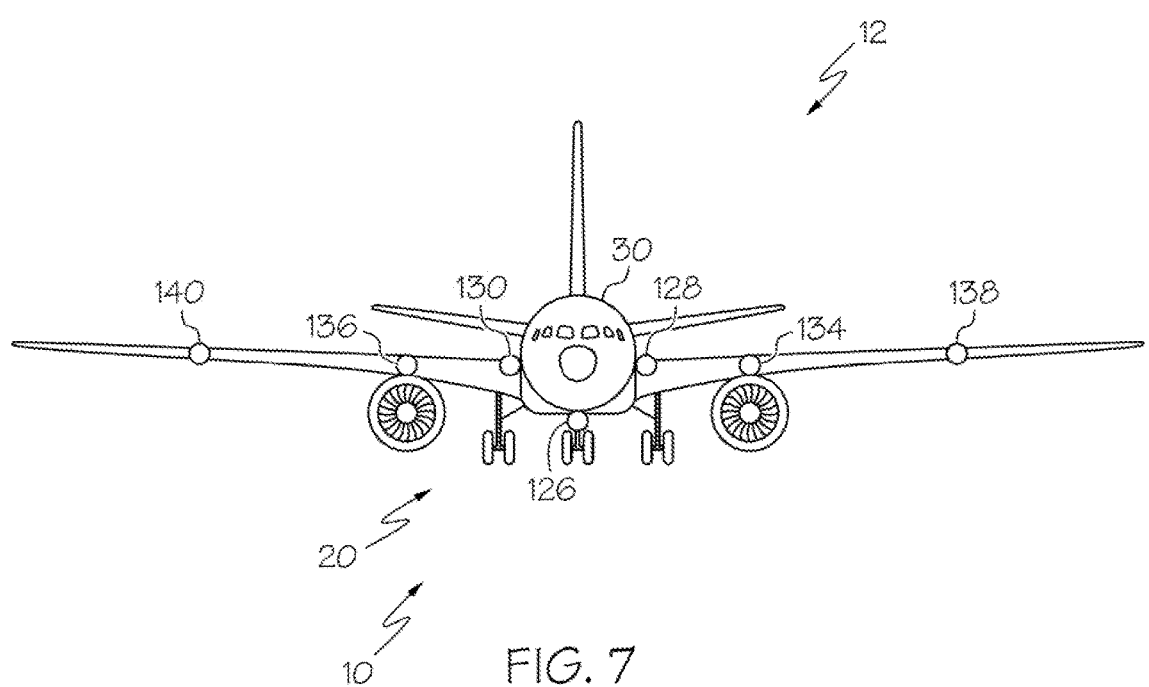
FIG. 7 is schematic illustration of another embodiment of the disclosed system for detection and avoidance.

Referring to FIG. 7, in an example embodiment, the image capture device 20 may be used to obtain images 24 for the detection system 50 by using the number of cameras 22 (FIG. 2) mounted on the vehicle 12 (e.g., aircraft 30). The cameras 108 (FIG. 5) may be mounted to the vehicle at any suitable or appropriate location. For example, the cameras 108 may be mounted on the vehicle 12 looking forwardly and having an unobstructed field of view 40 (e.g., a field of view 40 not obstructed by the vehicle 12). At least two cameras 108 having an overlapping field of view 106 that covers the target area 167 (FIG. 1) may be mounted to the vehicle 12 in order to identify the distance 39 of the object 16 (FIG. 3) relative to the vehicle 12. For example, the target area 167 may include a cone extending forward of the vehicle 12.

For example, two cameras 108 (FIG. 5) may be mounted proximate to (e.g., at or near) the nose of the aircraft 30 (e.g., proximate the radome of the aircraft), at location 126. As another example, at least one camera 108 may be mounted on each opposing side of the aircraft 30 proximate the wing to body fairing of the aircraft 30, at locations 128 and 130. As another example, at least one camera 108 may be mounted proximate to each engine pylon of the aircraft 30, at locations 134 and 136. As another example, at least one camera 108 may be mounted to a leading edge of each wing of the aircraft 30, as locations 138 and 140.

Those skilled in the art will appreciate that the cameras 108 (FIG. 5) may be mounted to the vehicle (e.g., aircraft 30) at any other suitable or appropriate location. For example, the cameras 108 may be mounted to any combination of locations 126, 128, 130, 134, 136, 138, 140 on the aircraft 30 and all of the locations illustrated in FIG. 7 may not require or include a camera 108, depending upon the configuration of the system 10. As another example, the cameras 108 may be mounted to any combination of locations 126, 128, 130, 134, 136, 138, 140 on the aircraft 30 in addition to other locations, depending upon the configuration of the system 10. As another example, the cameras 108 may be mounted to any location other than the locations 126, 128, 130, 134, 136, 138, 140 illustrated in FIG. 7, depending upon the configuration of the system 10. Further, those skilled in the art will also recognize that one or more of the locations illustrated in FIG. 7 may be locations of cameras that are part of the non-dedicated camera systems 96 (FIG. 5) of the aircraft 30.

Referring again to FIG. 8, the detection system 50 may include an image receiver 146, an image processor 148, a strike predictor 150, a strike avoidance generator 152, and a strike avoidance report sender 154. For example, the functions provided by the image receiver 146, the image processor 148, the strike predictor 150, the strike avoidance generator 152, and the strike avoidance report sender 154 may be performed in whole or in part by the data processing system 54.

The image receiver 146 may be configured to receive the images 24. For example, the image receiver 146 may be configured to receive the images 24 obtained by the image capture system 20 (e.g., the number of cameras 22 mounted on the vehicle 12) (FIG. 2).

The image capture system 20 may be physically connected or wirelessly connected to the detection system 50 (FIG. 2). For example, the number of cameras 22 may be physically connected to the image receiver 146 (e.g., wired connection). As another example, the number of cameras 22 may be wirelessly connected to the image receiver 146.

The data processing system 54 of the detection system 50 may also include an optional image compressor 147. For example, the image receiver 146 may include the optional image compressor 147. The optional image compressor 147 may include any suitable image compression or optimization tool configured to compress raw images 24. In an example implementation, the optional image compressor 147 may be configured to reduce irrelevance and/or redundancy of the images 22 in order to store and transmit the images 24 in an efficient form.

The surface configuration information 64 may be stored, in whole or in part, as part of the detection system 50 or in a data storage unit 166 that is not part of the detection system 50 but that may be accessible by the detection system 50.

The image processor 148 may be configured to process the images 24 to identify the image of the object 16 that may potentially strike the vehicle 12 in a number of images 24 (FIG. 2). For example and without limitation, the image processor 148 may be configured to identify the object 16 in a series of video images 28 and to track movement 36 of the object 16 (FIG. 3) with respect to the vehicle 12 over time.

The image processor 148 may also be configured to process the images 24 to determine various characteristics 32 (FIG. 3) of the object 16. For example and without limitation, the image processor 148 may be configured to process the images 24 to identify the size 38, other characteristics 56 (FIG. 3), or combinations of characteristics 32 of the object 16.

The strike predictor 150 may be configured to track the movement 36 of the object 16 (FIG. 3) relative to the vehicle 12 and to determine the probability of the potential strike 60 (FIG. 2) (e.g., the probability that the path 18 of the object 16 will intersect the path 14 of the vehicle 12).

For example, the strike predictor 150 may be configured to use the identified movement 36, distance 39, impact angle, and/or other characteristics 32 (FIG. 3) of the object 16 (e.g., as provided by the image processor 148) in combination with vehicle information 66 (FIG. 2) to determine whether the object 16 is likely to strike the vehicle 12. For example and without limitation, the strike predictor 150 may be configured to determine that a potential strike 60 (FIG. 2) between the vehicle 12 and the object 16 is likely to occur by determining that the movement 36 and distance 39 of the object 16 with respect to the vehicle 12 and that the size 38 (FIG. 3) of the object 16 indicates that at least a portion of the object 16 and at least a portion of the vehicle 12 will be in the same place at the same time.

The strike predictor 150 may be configured to generate one or more avoidance commands 70 (e.g., instructions and/or recommendations) (FIG. 2). The avoidance command 70 may include one or more actions that may be taken to avoid a collision between the vehicle 12 and the object 16. For example and without limitation, the avoidance command 70 may include a recommended course correction (e.g., a change in the direction of movement of the aircraft 30) (FIG. 1), a change in velocity 162 of the aircraft 30, a change in altitude of the aircraft 30, a change to the pitch, roll, and/or yaw of the aircraft 30, any other suitable flight correction, or a combination of such flight corrections or changes.

The strike predictor 150 may use the surface configuration information 64 to identify a predicted location 58 on the surface of the vehicle 12 that is likely to be struck by the object 16. The strike predictor 150 may also be configured to identify other characteristics 62 of the potential strike 60 (FIG. 2) (e.g., whether the potential strike 60 is likely to cause damage to the vehicle 12).

The strike avoidance report generator 152 may be configured to generate the strike avoidance report 68. The strike avoidance report 68 may include information about the potential strike 60, characteristics 32 of the object 16, and/or one or more avoidance commands 70 (FIG. 2) (e.g., as may be determined by the image processor 146 and the strike predictor 150).

The strike avoidance report sender 154 may be configured to send the strike avoidance report 68 to any of a number of users (e.g., operator 76), devices, and/or systems (e.g., vehicle management system 74) of the vehicle 12. The implementation of the strike avoidance report sender 154 for any particular application may depend upon the specific characteristics of the users, devices, and/or systems that may receive the strike avoidance report 68. For example, the strike avoidance report sender 154 may be physically connected to the vehicle management system 74 (e.g., wired connection). As another example, the strike avoidance report sender 154 may be wirelessly connected to the vehicle management system 74.

Figure 9:
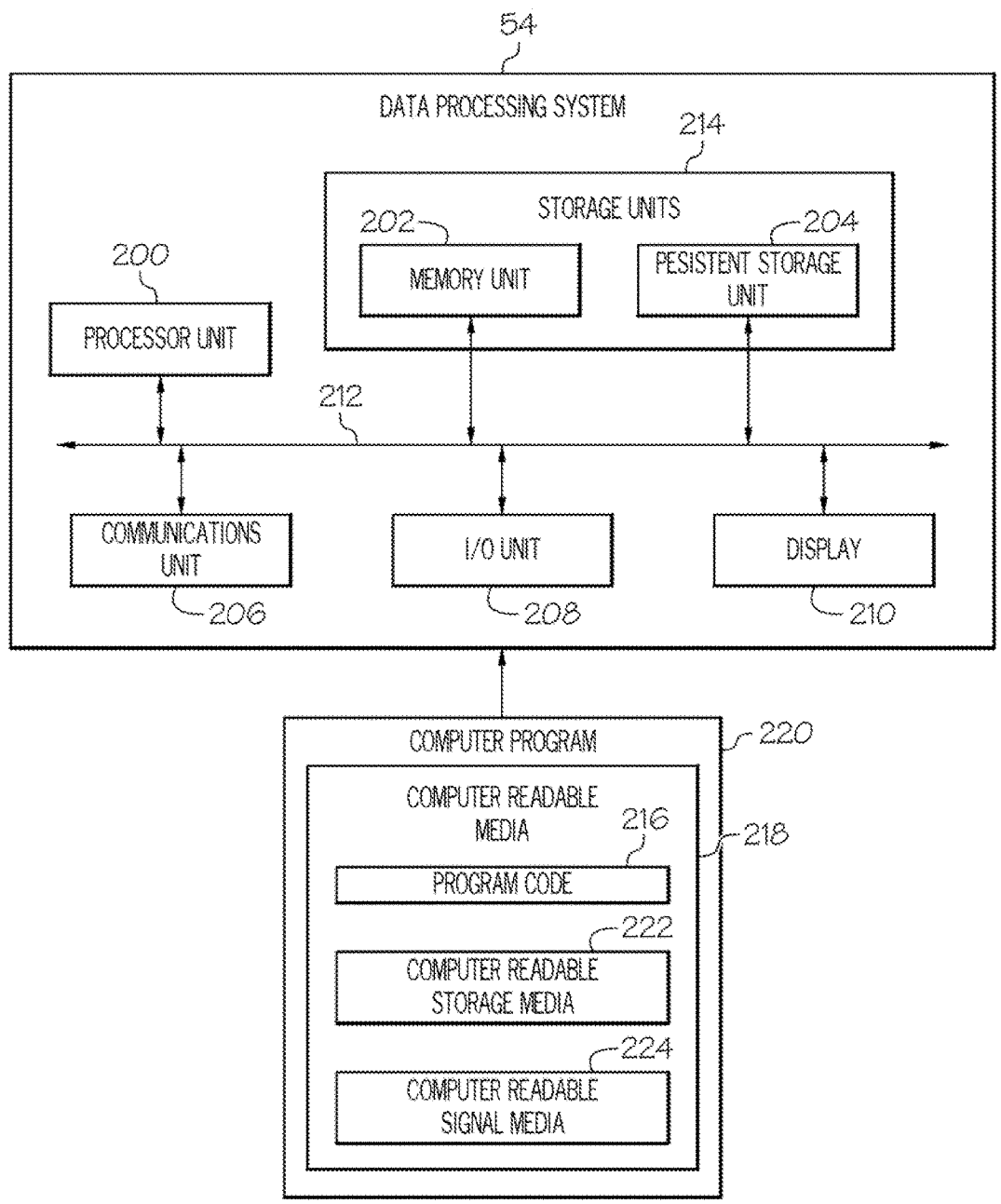
FIG. 9 is a block diagram of an embodiment of the data processing system of the detection system.

Referring to FIG. 9, the detection system 50 (FIG. 2) may be implemented in software running on a data processing system 54, in hardware, or in a combination of software and hardware. For example and without limitation, the detection system 50 may be implemented, in whole or in part, on a dedicated data processing system 54 of the detection system 50 or on a data processing system that is used for other purposes on the vehicle 12.

In an example implementation of the data processing system 54 of the detection system 50 may include a processor unit 200, a memory unit 202, a persistent storage unit 204, a communications unit 206, an input/output (I/O) unit 208, a display 210, and a communications interface 212. The communications interface 212 may provide communications between one or more of the processor unit 200, memory unit 202, persistent storage unit 204, communications unit 206, input/output (I/O) unit 208, and display 210. For example, memory unit 202, persistent storage unit 204, communications unit 206, input/output (I/O) unit 208, and display 210 may be resources accessible by the processor unit 200 via the communications interface 212.

In an example implementation, a bus system may be used to implement the communications interface 212 and may include one or more buses, such as a system bus or an input/output bus. The bus system may be implemented using any suitable type of architecture that provides for a transfer of data between different components or devices connected to the bus system.

The processor unit 200 may be configured to run instructions for software that may be loaded into the memory unit 202. The processor unit 200 may be a number of processors, a multi-processor core, or any other type of processor, depending upon the particular implementation of the data processing system 54. For example, the processor unit 200 may be implemented using a number of heterogeneous processor systems in which a main processor is present with one or more secondary processors on a single chip. As another example, the processor unit 200 may be a symmetric multi-processor system containing multiple processors of the same types.

The memory unit 202 and persistent storage unit 204 may be examples of storage units 214. The storage unit 214 may include any device (e.g., a piece of hardware) configured to be capable of storing information. For example, information may include, but is not limited to, data, program code in functional form, and other suitable information either on a temporary or permanent basis. The storage unit 214 may also be referred to as computer readable storage devices or medium.

The memory unit 202 may take various forms, depending upon the implementation of the data processing system 54. For example, the memory 202 may be random-access memory ("RAM"), dynamic random-access memory ("DRAM"), read-only memory ("ROM"), flash memory, and/or any other type of suitable volatile or non-volatile memory or storage device. Further, memory may be a cache, such as that found in an interface and memory controller hub that may be present in the communications interface 212.

The persistent storage unit 204 may take various forms, depending upon the implementation of the data processing system 54. For example, the persistent storage unit 204 may be a hard drive, flash memory, a rewritable optical disk, a rewritable magnetic tape, or some combination of hard drive, flash memory, rewritable optical disk, and rewritable magnetic tape. The media used by the persistent storage unit 204 may be removable (e.g., a removable hard drive).

The communications unit 206 may be configured to provide for communications with other data processing systems or devices. For example and without limitation, the communications unit 206 may include a network interface card. The communications unit 206 may be configured to provide communications through the use of either or both physical and wireless communications links. Additionally, the communications unit 206 may include a number of devices that transmit data, receive data, or both transmit and receive data. The communications unit 206 may be a modem or a network adapter, two network adapters, or some combination thereof.

The input/output unit 208 may be configured to allow for input and output of data with other devices that may be connected to the data processing system 54. For example, the input/output unit 208 may provide a connection for input information from a user through a keyboard, a mouse, a touch screen interface, and/or some other suitable input device. As another example, the input/output unit 208 may provide a connection for input information from one or more systems or devices of the detection system 50 (e.g., the image capture system 20) (FIG. 2) through a communications bus and/or some other suitable input device. As another example, the input/output unit 208 may provide a connection for input information from one or more systems or devices of the vehicle 12 (e.g., vehicle systems 72) (FIG. 2) through a communications bus and/or some other suitable input device.

Further, the input/output unit 208 may be configured to provide output information to one or more users. For example, the input/output unit 208 may send output (e.g., strike avoidance report 68) to the vehicle 12 (e.g., the vehicle management system 74) (FIG. 2) for use by the operator 76. As another example, the input/output unit 208 may send output to a dedicated display 210 of the detection system 50. The display 210 may be configured to display information to a user (e.g., the operator 76 of the vehicle 12) (FIG. 2). As another example, the input/output unit 208 may send output to a printer.

Instructions for the operating system, applications, and/or programs may be located in the storage units 214, which are in communication with the processor unit 200 through the communications interface 212. In the illustrated examples, the instructions may be in a functional form on the persistent storage unit 204. The instructions may be loaded onto the memory unit 202 for execution by the processor unit 200. The process of the different embodiments may be performed by the processor unit 200 using computer-implemented instructions, which may be located in the memory storage unit 214 (e.g., memory unit 202).

The instructions may be referred to as program instructions, program code, computer usable program code, or computer readable program code that may be read and executed by one or more processors in the processor unit 200. The program code may be embodied on different physical or computer readable storage media, such as the storage unit 214 (e.g., memory unit 202 or persistent storage 204).

Program code 216 may be located in a functional form on computer readable media 218 that is selectively removable or fixed and may be loaded onto or transferred to the data processing system 54 for execution by the processor unit 200. Program code 216 and computer readable media 218 may form computer program 220. For example, computer readable media 218 may be computer readable storage media 222 or computer readable signal media 224.

In an example implementation, computer readable storage media 222 may include an optical or magnetic disk that is inserted or placed into a drive or other device that is part of the persistent storage unit 204 for transfer onto a storage device (e.g., a hard drive) that is part of the persistent storage unit 206. In another example implementation, computer readable storage media 222 may also take the form of persistent storage, such as a hard drive, a thumb drive, or a flash memory, that is connected to the data processing system 54.

In the above example implementations, computer readable storage media 222 may be a physical or tangible storage device used to store program code 216 rather than a medium that propagates or transmits program code 216. Thus, computer readable storage media 222 may also be referred to as a computer readable tangible storage device or a computer readable physical storage device.

In another example implementation, program code 216 may be transferred to the data processing system 54 using computer readable signal media 224. For example, computer readable signal media 224 may be a propagated data signal containing program code 216. In an example implementation, computer readable signal media 224 may be an electromagnetic signal, an optical signal, and/or any other suitable type of signal. The signals may be transferred over communications links, such as, but not limited to, wireless communications links, optical fiber cable, coaxial cable, a wire, and/or any other suitable type of communications link.

In another example implementation, program code 216 may be downloaded over a network to the persistent storage unit 204 from another device or data processing system through computer readable storage media 224 for use by the data processing system 54. For example, program code 216 stored in a computer readable storage medium in a server data processing system may be downloaded over a network from the server to the data processing system 54. The data processing system providing the program code 216 may be a server computer, a client computer, or some other device capable of storing and transmitting program code 216.

In another example implementation, the processor unit 200 may take the form of a hardware unit that has circuits that are manufactured or configured for a particular use. This type of hardware may perform operations without needing program code to be loaded into a memory from a storage device to be configured to perform the operations disclosed.

For example, when the processor unit 200 takes the form of a hardware unit, the processor unit 200 may be a circuit system, an application specific integrated circuit ("ASIC"), a programmable logic device ("PLD"), a programmable logic controller ("PLC"), or some other suitable type of hardware configured to perform a number of operations. The hardware unit (e.g., a programmable logic device) may be temporarily configured, reconfigured at a later time, or may be permanently configured to perform the number of operations. Examples of programmable logic devices may include programmable array logic, a field programmable logic array, and other suitable hardware devices. With this type of implementation, program code 216 may be omitted because the process for performing the operations may be implemented in the hardware unit.

In another example implementation, the processor unit 200 may be implemented using a combination of processors found in computers and hardware units. The processor unit 200 may have a number of hardware units and a number of processors that are configured to run program code 216. For example, some of the processes or operations may be implemented in the number of hardware units while other processes or operations may be implemented in the number of processors.

Any appropriate or suitable methods may be used by the detection system 50 to process the images 24 to identify an object 16 that may strike the vehicle 12, to determine characteristics 32 of the object 16, to determine characteristics 62 of the potential strike 60, to track the movement of the object 16, to determine whether a potential strike 60 is likely to occur, and/or to generate one or more avoidance commands 70 (FIG. 2).

For example, any appropriate method may be used by the detection system 50 to distinguish images of the object 16 that may potentially strike the vehicle 12 from the background in the images 24 provided by the image capture system 20 (FIG. 2). Further, any appropriate method may be used to identify movement 36 (FIG. 3) of the object 16 with respect to the vehicle 12 to track the object 16 in multiple images 24 over time. For example, any appropriate geometric calculations, trigonometric calculations, and/or algorithmic functions may be used to determine whether the movement 36 of the object 16 with respect to the vehicle 12 indicates that the object 16 is likely to strike the vehicle 12 and the predicted location 58 of the potential strike 60 (FIG. 2) on the vehicle 12.

Figure 10:
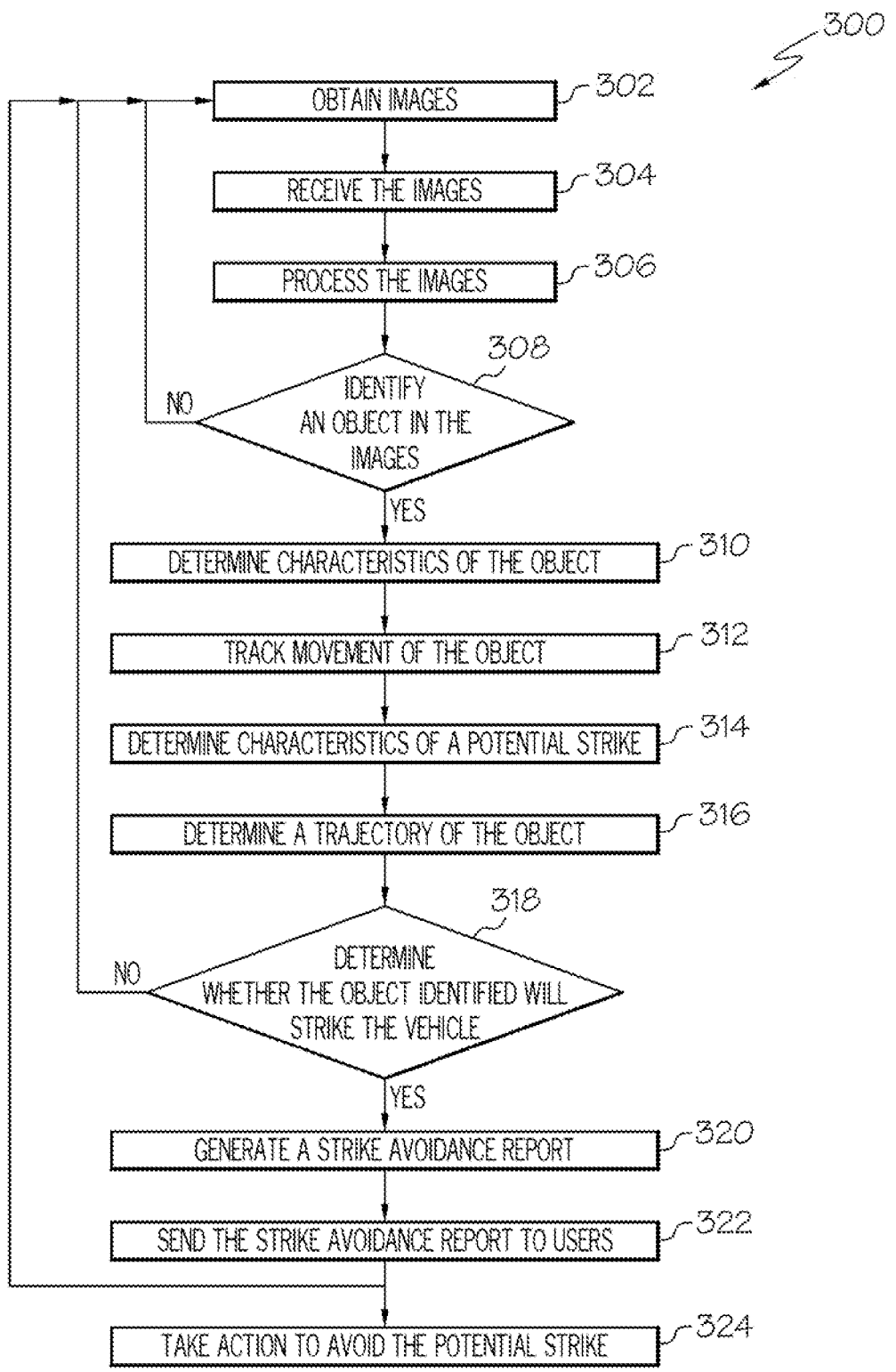
FIG. 10 is a flow diagram on an embodiment of the disclosed method for detection and avoidance.

Referring to FIG. 10, also disclosed is a method, generally designated 300, for detection and avoidance. The disclosed method 300 may be implemented in whole or in part in the system 10 as illustrated in FIG. 2 or in the detection system 50 as illustrated in FIG. 8. The process and/or processes of the disclosed method 300 may be repeated during all or part of the time that a vehicle 12 is in operation (e.g., during taxi, takeoff, flight, and/or landing of the aircraft 30) to detect an object 16 that is likely to strike the vehicle 12, track the object 16 relative to the vehicle 12, determine the likelihood (e.g., probability) of a potential strike 60, and to take action to avoid the potential strike 60 (FIG. 2).

As shown at block 302, the method 300 may begin by obtaining a plurality (e.g., a sequential series) of images 24 (FIG. 2). For example and without limitation, the images 24 may be obtained by an image capture system 20 associated with or connected to a vehicle 12. As an example implementation, the image capture system 20 may include a number of cameras 24 mounted to various locations on an aircraft 30.

As shown at block 304, the images 24 (FIG. 2) may be received. For example and without limitation, a detection system 50 may receive the images 24 from the image capture system 20 (FIG. 2). In an example implementation, an image receiver 146 (FIG. 8) may receive and/or obtain the images 24 from the number of cameras 22.

As shown at block 306, the images 24 may be processed to identify the presence of an object 16 that may potentially strike the vehicle 12 (e.g., an object 16 located within the field of view 40 of the image capture system 20) (FIG. 1). For example and without limitation, the images 24 may be processed by a data processing system 54 of the detection system 50 (FIG. 2). In an example implementation, the images 24 may be processed by an image processor 148 (FIG. 8) to identify the object 16 in the images 24. As a specific non-limiting example, the image processor 148 may process the images 24 to identify a bird 34 that may strike the aircraft 30 (FIG. 1).

The process or operation shown at block 306 may also include processing the images 24 to distinguish images of the object 16 that may potentially strike the vehicle 12 from images of the background. Any suitable method for identifying the object 16 that is likely to strike the vehicle 12 in the images 24 may be used.

For example, the image capture system 20 may include a camera system (e.g., a dedicated camera system 94, a non-dedicated camera system 96, or a combination of a dedicated camera system 94 and a non-dedicated camera system 96) (FIG. 5) including the number of cameras 22. In an example implementation, the number of cameras 22 used may provide infrared images. A difference in radiation (e.g., as a function of temperature) between the object 16 and the background may be used to identify the object 16 in the images 24.

As shown in block 308, the detection system 50 (FIG. 2) may determine whether or not an object 16 that may potentially strike the vehicle has been identified (e.g., by processing the images 24, as depicted in block 306). If an object 16 that may potentially strike the vehicle 12 (e.g., an object 16 located within the target area 167 (FIG. 1) is not identified in the images 24, the process may return to the start (e.g., block 302). The operations illustrated at block 302 and 308 may be repeated to continue to receive the images 24 (FIG. 8) and process the images 24 until it is determined that an object 16 that may potentially strike the vehicle 12 has been identified in the images 24 (e.g., block 308).

As shown at block 310, upon identification of the object 16 that may potentially strike the vehicle 12 (e.g., an object 16 located within the target area 167), characteristics 32 (FIG. 3) of the object 16 may be identified and/or determined. For example, the operation shown at block 310 may include processing the images 24 (FIG. 8) to identify the movement 36, size 38, other characteristics 56, or a combination of characteristic 32 (FIG. 3) of the object 16. Any appropriate method may be used to identify the characteristics 32 of the object 16. For example and without limitation, the movement 36 of the object 16 with respect to the vehicle may be identified by determining the apparent distance 39 (FIG. 3) of the object 16 relative to the vehicle 12 and the apparent direction 48 (FIG. 3) of travel of the object 16 relative to the vehicle 12 from the changing position of the object 16 in a series of images 24 over time.

As shown at block 312, the movement 36 of the object 16 (FIG. 3) may be tracked relative to the vehicle 12. For example, the movement 36 (e.g., speed 46 and direction 48) of the object 16 may be tracked relative to the movement of the vehicle 12. For example and without limitation, the data processing system 54 may track the movement 36 of the object relative to the movement of the vehicle 12. In an example implementation, the images 24 may be processed by an image processor 148 and/or the strike predictor 150 (FIG. 8) to track the movement of the object 16 relative to the movement of the vehicle 12. As a specific non-limiting example, the image processor 148 and/or the strike predictor 150 may track relative movement of a bird 34 that may strike the aircraft 30 (FIG. 1).

As shown at block 314, upon identification of the object 16 that may potentially strike the vehicle 12 (e.g., an object 16 located within the target area 167), information and/or characteristics of a potential strike 60 (FIG. 2) may be determined. For example, the detection system 50 may determine characteristics 62 of the potential strike 60 (FIG. 2).

As shown at block 316, a trajectory of the object 16 relative to the vehicle 12 may be determined (e.g., a predicted collision course between the object 16 and the vehicle 12). For example, the data processing system 54 may compute the trajectory of the object 16 (e.g., along path 18) relative the trajectory of the vehicle 12 (e.g., along path 14). For example, the determination of the trajectory of the object 16 may be based on the identified characteristics 32 of the object 16 (e.g., movement 36 and size 38) (FIG. 3), as depicted in block 310; the tracked movement 36 of the object 16 relative to the vehicle 12, as depicted in block 312; and/or the identified characteristics 68 of the potential strike 60 (FIG. 2).

As shown at block 318, a determination may be made whether the object 16 identified in the images 24 (e.g., blocks 306 and 308) will strike the vehicle 12 if no action is taken (e.g., a potential strike 60) (FIG. 2). For example, the data processing system 54 (FIG. 8) may estimate the probability that a strike will occur. For example, the strike predictor 150 may determine the probability that the trajectory of the object 16 (e.g., along path 18) relative to the trajectory of the vehicle 12 (e.g., along path 14) indicates that the path 18 of the object 16 and the path 14 of the vehicle 12 will intersect and thus, a potential strike 60 (FIG. 2) is likely to occur.

If it is determined that the object 16 will not strike the vehicle 12 (e.g., an acceptably low probably of a potential strike 60), the process may return to the start (e.g., block 302). The operations illustrated at blocks 302-318 may be repeated to continue to receive images 24 (block 304), process the images 24 until it is determined that an object 16 that may potentially strike the vehicle 12 has been identified (e.g., blocks 306 and 308), track movement of the object 16 (e.g., block 312), predict the trajectory of the identified object 16 (e.g., block 316), and determine the probability that the identified object 16 will potentially strike the vehicle 12 (e.g., block 318) if no action is taken.

If it is determined that the object 16 identified will strike the vehicle 12 (e.g., an unacceptably high probability of a potential strike 60), the process continues, as depicted in blocks 320-324.

For example and without limitation, the operations shown at blocks 310-318 may include determining an intersection line of the trajectory of the object 16 with respect to trajectory of the vehicle 12. The vehicle 12 may include a stored representation of the surface of the vehicle 12 (e.g., surface configuration information 64). Thus, the operations shown at blocks 310-318 may include determining an intersection line of the trajectory of the object 16 relative to the trajectory of the representation of the surface of the vehicle 12.

If it is determined that the trajectory of the object 16 with respect to the trajectory of the representation of the surface of the vehicle 12 do not intersect, then a potential strike 60 is unlikely to occur. If it is determined that the trajectory of the object 16 with respect to the trajectory of the representation of the surface of the vehicle 12 intersect, then a potential strike 60 is likely to occur. In this case, the location of the intersection of the trajectory of the object 16 with the representation of the surface of the vehicle 12 may also indicate the predicted location 58 of the potential strike 60 on the vehicle 12.

Due to measurement imprecision, the actual path (e.g., actual trajectory) of the object 16 that may potentially strike the vehicle 12 may be unlikely to lie exactly along the predicted path (e.g., predicted trajectory) of the object 16 as identified in the operation shown at block 316. Rather, it may lie somewhere near that path. Thus, the object 16 that may be predicted to miss the vehicle 12 by a modest distance may actually have a non-zero chance to strike the vehicle 12. Accordingly, any unacceptably high probability of the potential strike 60 may indicate a strike is likely to occur. For example and without limitation, a 10% probability that the trajectory of the object 16 will intersect the trajectory of the vehicle 12 may indicate that a potential strike 60 is likely to occur.

Thus, the operation shown at blocks 308-318 may include determining the probability that the object 16 may potentially strike the vehicle 12 and optionally, the predicted location 58 of the potential strike 60 using the estimated movement 36, size 38 and/or other characteristics 56 (FIG. 3) of the object 16 as identified in one or more of the previous operations. Any appropriate method may be used to determine whether the object 16 will or is likely to strike the vehicle 12, the characteristics 32 of the object 16, the predicted location 58 of the potential strike 60, and/or other characteristics 62 of the potential strike 60.

As shown at block 320, a strike avoidance report 68 (FIG. 8) may be generated for the object that may potentially strike the vehicle 12. For example, a strike avoidance report 68 may be generated for each object 16 that has an unacceptably high probability of impacting the vehicle 12 as determined by the previous operations (e.g., blocks 316 and 318). The strike avoidance report 68 may be generated by the detection system 50 (FIG. 2). In an example implementation, the strike avoidance report 68 may be generated by the strike avoidance report generator 152 (FIG. 8).

In an example implementation, the strike avoidance report 68 may include that a bird 34 has been identified that may potentially strike the aircraft 30, the movement 36 (e.g., speed 46 and direction 48) (FIG. 3) of the bird 34, the predicted location 58 of the potential strike 60 on the surface of the aircraft 30, other characteristics 62 of the potential strike 60, that a potential strike 60 is likely to occur if no action is taken, or combinations of such information.

As shown at block 322, the strike avoidance report 68 (FIG. 8) may be sent to users of the strike avoidance report 68. For example and without limitation, the users of the strike avoidance report 68 may include a human operator 76 (FIG. 2) of the vehicle 12, a remote human operator of the vehicle 12, an automated control system for the vehicle 12, or any other user that may use the information in the strike avoidance report 68.

In an example implementation, the strike avoidance report 68 may be sent to the pilot or flight crew of the aircraft 30 in the form of an audible or visual alert to inform the pilot that a bird 34 (FIG. 1) has been identified which is likely to strike the aircraft 30. The strike avoidance report 68 may include information about various characteristics 32 (e.g., size 38 and movement 36) (FIG. 3) of the bird 34 and various characteristics 62 of the potential strike 60 if it were to occur. The pilot may then make a decision as to whether or not to take evasive action in an attempt to avoid the collision between the bird 34 and the aircraft 30.

As shown at block 324, action may be taken to avoid the potential strike 60 (FIG. 2). For example, the operator 76 of the vehicle 12 (FIG. 2) may take evasive actions in accordance with the instructions and/or recommendations of the avoidance command 70 (FIG. 2). As another example, the vehicle management system 74 of the vehicle 12 (FIG. 2) may automatically take evasive actions in accordance with the instructions provided in the avoidance command 70.

For example, based on the information provided in the strike avoidance report 68, the pilot may decide that no action is necessary since the characteristics of bird 34 and the potential strike 60 indicate that action is not advisable based on current flight conditions. The strike avoidance report 68 may include one or more instructions or recommendations (e.g., avoidance commands 70) (FIG. 2), which may be used by the pilot to make a course correction and/or an evasive action in an attempt to avoid the collision.

In another example implementation, the strike avoidance report 68 may be sent directly to the flight control system of the aircraft 30 in form of flight control instructions and/or commands. The flight control system of the aircraft 30 may automatically take evasive actions in an attempt to avoid a collision between the bird 34 and the aircraft 30 in response to the avoidance command 70 in the strike avoidance report 68.

Those skilled in the art will appreciate that the block diagrams and flowcharts described herein illustrate architecture, functionality, and operations of example embodiments and implementations of the disclosed systems and methods. In this regard, each block in the flowcharts and block diagrams may represent a module, segment or portion of code, which may include one or more executable instructions for implementing the specified logic function or functions. It should also be noted that, in some embodiments and implementations, the functions depicted in the blocks may occur out of the order noted in the figures. For example, the functions of two blocks shown in succession may be executed substantially concurrently or the functions of the blocks may sometimes be executed in an alternate order (e.g., reverse order), depending upon the functionality involved.

Accordingly, one or more of the disclosed embodiments may provide a capability to detect and track an airborne object approaching, crossing the path of, or near an aircraft. A system and method in accordance with the disclosed embodiments may be used to determine if one or more airborne objects are likely to strike the aircraft. If a potential strike is identified, characteristics of the strike and characteristics of the object may be provided or reported to the operator of the vehicle, to a vehicle control system, or another user. If a potential strike is identified, one or more avoidance commands may be provided to the operator of the vehicle or to the vehicle control system. With this information, the operator of the vehicle may make better-informed decisions about how to respond to the potential strike, such as whether to take evasive actions to avoid the strike, and what evasive actions may be taken to avoid the potential strike.

Although various embodiments of the disclosed systems and methods have been shown and described, modifications may occur to those skilled in the art upon reading the specification. The present application includes such modifications and is limited only by the scope of the claims.

What is claimed is:

1. A system for detection and avoidance, said system comprising:
    a detection system associated with a vehicle, said detection system comprising:
        at least two cameras to capture images within a field of view;
        an image processor to process said images to:
            identify an object within said field of view; and
            determine a size of said object and a position of said object with respect to said vehicle;
        a strike predictor to:
            track movement of said object from changes in said position;
            determine surface configuration information of said vehicle and movement of said vehicle from a vehicle management system, said surface configuration information comprising information representing a size of said vehicle and shapes of exterior surfaces of said vehicle, and
            determine whether a potential strike between said vehicle and said object will occur from said movement of said object with respect to said vehicle;
            determine a predicted location on said vehicle where said potential strike will occur from said size of said object, said movement of said object said surface configuration information of said vehicle, said movement of said vehicle; and
            determine a potential damage to said vehicle due to said potential strike at said predicted location from said movement of said object, said size of said object, said movement of said vehicle, and said surface configuration information of said vehicle; and
        a strike avoidance report generator to generate a strike avoidance report comprising information about at least one of said potential strike, said predicted location and said potential damage.

2. The system of claim 1 wherein said strike avoidance report comprises an avoidance command to avoid said potential strike based on a determination that said potential strike will occur, said predicted location and said potential damage, and
    wherein said avoidance command comprises at least one of a change in a direction of direction of said vehicle and a change in velocity of said vehicle suitable to avoid said potential strike.

3. The system of claim 2 wherein said detection system further comprises a strike avoidance report sender to transmit said strike avoidance report to said vehicle management system.

4. The system of claim 1 wherein said cameras are connected to said vehicle, and wherein said field of view is oriented in a direction of movement of said vehicle.

5. The system of claim 1 wherein said cameras are configured to capture said images in one or more of a visible spectrum, an ultraviolet spectrum, a far infrared spectrum, a mid infrared spectrum, and a near infrared spectrum.

6. The system of claim 1 wherein said images comprise video images.

7. The system of claim 1 wherein:
    said image processor further determines one or more of a distance of said object from said vehicle, a velocity of said object, and an approach angle of said object,
    said strike predictor further determines whether said potential strike will occur from one or more of said distance of said object, said velocity of said object, said size of said object, and said angle of approach of said object, and
    said strike avoidance report further comprises one or more of said distance of said object, said velocity of said object, said size of said object, and said angle of approach of said object.

8. The system of claim 7 wherein said strike predictor further determines said predicted location on said vehicle where said potential strike will occur from one or more of, said distance of said object, said velocity of said object, and said angle of approach of said object.

9. The system of claim 8 wherein said strike predictor further determines said potential damage to said vehicle due to said potential strike at said predicted location from one or more of said distance of said object, said velocity of said object, and said angle of approach of said object.

10. The system of claim 3 wherein said vehicle management system comprises a display, and wherein said strike avoidance report comprises a message to an operator of said vehicle, said message comprising said avoidance command.

11. The system of claim 3 wherein said vehicle management system comprises a vehicle control system on said vehicle, and wherein said strike avoidance report comprises a vehicle control command, said vehicle control command comprising control signals for said vehicle control system to automatically execute said avoidance command.

12. The system of claim 1 wherein said vehicle is an aircraft and said object is a bird.

13. A system for detection and avoidance, said system comprising:
   an aircraft;
   at least two cameras coupled to said aircraft to capture pairs of images within a field of view;
   an image processor to process said images to:
      identify an airborne object within said field of view; and
      determine a size of said airborne object and a position of said airborne object with respect to said aircraft; and
   a strike predictor to:
      track movement of said airborne object from changes in said position;
      determine surface configuration information of said aircraft and movement of said aircraft from a flight management system of said aircraft, said surface configuration information comprising information representing a size of said aircraft and real-time shapes of exterior surfaces of said aircraft;
      determine whether a potential strike between said aircraft and said airborne object will occur from said movement of said airborne object with respect to said movement of said aircraft,
      determine a predicted location on said aircraft where said potential strike will occur from said movement of said airborne object, said size of said airborne object, said movement of said aircraft, and said surface configuration information of said aircraft; and
      determine a potential damage to said aircraft due to said potential strike at said predicted location from said movement of said airborne object, said size of said airborne object, said movement of said vehicle, and said surface configuration information of said vehicle.

14. The system of claim 13 further comprising:
   a strike avoidance report generator to generate a strike avoidance report; and
   a strike avoidance report sender to transmit said strike avoidance report to said flight management system of said aircraft,
   wherein said strike avoidance report comprises an avoidance command to avoid said potential strike based on said whether said potential strike will occur, said predicted location, and said potential damage, and
   wherein said avoidance command comprises at least one of a change in a direction of said aircraft, a change in velocity of said aircraft, a change in altitude of said aircraft, and a change in one or more of pitch, roll and yaw of said aircraft suitable to avoid said potential strike.

15. The system of claim 14 wherein:
   said image processor further determines one or more of a distance of said airborne object from said aircraft, a velocity of said airborne object, and an approach angle of said airborne object,
   said strike predictor further determines whether said potential strike will occur from one or more of said distance of said airborne object, said velocity of said airborne object, said size of said airborne object, said approach angle of said airborne object, and said surface configuration information of said aircraft, and
   said strike avoidance report further comprises one or more of said distance of said airborne object, said velocity of said airborne object, said size of said airborne object, and said approach angle of said airborne object.

16. The system of claim 14 wherein said flight management system comprises a display, and wherein said strike avoidance report comprises a message to an operator of said aircraft, said message comprising said avoidance command.

17. The system of claim 14 wherein said flight management system comprises a flight control system on said aircraft, and wherein said strike avoidance report comprises a flight control command, said flight control command comprising control signals for said flight control system to automatically execute said avoidance command.

18. The system of claim 15 wherein:
   said strike predictor further determines said predicted location on said aircraft where said potential strike will occur from one or more of said distance of said airborne object, said velocity of said airborne object, and said approach angle of said airborne object,
   said strike predictor further determines said potential damage to said aircraft due to said potential strike at said predicted location from one or more of said distance of said object, said velocity of said airborne object, and said approach angle of said airborne object, and
   said strike avoidance report further comprises said predicted location on said aircraft where said potential strike will occur and said potential damage to said aircraft.

19. A method for detection and avoidance, said method comprising:
   capturing pairs of images within a field of view;
   processing said images to:
      identify an object in said images; and
      determine a size of said object and a position of said object with respect to a vehicle;
   tracking movement of said object from changes in said position with respect to said vehicle;
   determining surface configuration information of said vehicle and movement of said vehicle, said surface configuration information comprising information representing a size of said vehicle and shapes of exterior surfaces of said vehicle;
   determining whether a potential strike between said vehicle and said object will occur from said movement of said object with respect to said vehicle, said size of object, said surface configuration information of said vehicle, and said movement of said vehicle;
   determining a predicted location on said vehicle where said potential strike will occur from said size of said object, said movement of said object said surface configuration information of said vehicle, said movement of said vehicle;
   determining a potential damage to said vehicle due to said potential strike at said predicted location from said movement of said object, said size of said object, said movement of said vehicle, and said surface configuration information of said vehicle; and
   generating a strike avoidance report comprising at least one of information indicating that said potential strike will occur, information indicating said predicted location, information indicating said potential damage, and an avoidance command based on a determination that said potential strike will occur at said predicted location and said potential damage.

20. The method of claim 19 further comprising:
- determining one or more of a distance of said object from said vehicle, a velocity of said object, and an approach angle of said object; and
- further determining said predicted location on said vehicle where said potential strike will occur from one or more of said distance of said object, said velocity of said object, and said angle of approach of said object.

* * * * *